(12) United States Patent
Nukariya et al.

(10) Patent No.: US 9,933,944 B2
(45) Date of Patent: Apr. 3, 2018

(54) INFORMATION PROCESSING SYSTEM AND CONTROL METHOD OF INFORMATION PROCESSING SYSTEM

(71) Applicant: FUJITSU LIMITED, Kawasaki-shi, Kanagawa (JP)

(72) Inventors: Atsushi Nukariya, Kawagoe (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 14/672,744

(22) Filed: Mar. 30, 2015

(65) Prior Publication Data
US 2015/0278102 A1    Oct. 1, 2015

(30) Foreign Application Priority Data

Mar. 31, 2014  (JP) ................. 2014-072703

(51) Int. Cl.
*G06F 3/06*    (2006.01)
*G06F 12/0866*    (2016.01)

(52) U.S. Cl.
CPC ............ *G06F 3/0608* (2013.01); *G06F 3/061* (2013.01); *G06F 3/064* (2013.01); *G06F 3/067* (2013.01); *G06F 3/0646* (2013.01); *G06F 3/0683* (2013.01); *G06F 12/0866* (2013.01)

(58) Field of Classification Search
None
See application file for complete search history.

(56) References Cited

U.S. PATENT DOCUMENTS

| 6,032,160 A * | 2/2000 | Lehman ................. G06F 12/023 |
| 9,317,213 B1 * | 4/2016 | Gupta ..................... G06F 3/064 |
| 2002/0065982 A1 * | 5/2002 | Colligan ............... G06F 3/0613 |
| | | 711/112 |

(Continued)

FOREIGN PATENT DOCUMENTS

| EP | 0375188 B1 | 1/1996 |
| JP | 5-197599 A | 8/1993 |

(Continued)

OTHER PUBLICATIONS

Extended European Search Report dated Aug. 25, 2015 for corresponding European Patent Application No. 15161203.3, 7 pages.

(Continued)

*Primary Examiner* — Adam M Queler
*Assistant Examiner* — Dustin Bone
(74) *Attorney, Agent, or Firm* — Fujitsu Patent Center

(57) ABSTRACT

An information processing system comprises a processor. The processor executes a process that causes the information processing system to perform first writing, when requested to write data, data from which to subtract remainder data obtained by dividing a data size of write target data by a first data size of first processing unit data, the first data size being a size of processing unit data of a reading/writing process in a first storage device, in the write target data requested to be written to the first storage device and second writing the remainder data not being written by the first writing to a second storage device in which to set a second data size of second processing unit data, the second data size being smaller than the first data size of the first processing unit data.

15 Claims, 8 Drawing Sheets

(56) References Cited

U.S. PATENT DOCUMENTS

| | | | |
|---|---|---|---|
| 2008/0052329 A1 | 2/2008 | Dodge et al. | |
| 2008/0104353 A1* | 5/2008 | Madisetti | G06F 12/023 711/170 |
| 2012/0131278 A1* | 5/2012 | Chang | G06F 12/0893 711/118 |
| 2013/0282976 A1* | 10/2013 | Dubnicki | G06F 12/00 711/112 |
| 2015/0095383 A1* | 4/2015 | Zhai | G06F 17/30138 707/823 |
| 2015/0106563 A1* | 4/2015 | Hsu-Hung | G06F 3/0614 711/114 |
| 2015/0199138 A1* | 7/2015 | Ramachandran | G06F 12/122 711/103 |

FOREIGN PATENT DOCUMENTS

| | | |
|---|---|---|
| JP | 2001-265628 A | 9/2001 |
| JP | 2003-150416 | 5/2003 |
| JP | 2008-052730 | 3/2008 |
| JP | 2013-512529 A | 4/2013 |

OTHER PUBLICATIONS

Japanese Office Action dated Oct. 17, 2017 for corresponding Japanese Patent Application No. 2014-072703, with English Translation, 7 pages.

\* cited by examiner

US 9,933,944 B2

INFORMATION PROCESSING SYSTEM AND CONTROL METHOD OF INFORMATION PROCESSING SYSTEM

CROSS-REFERENCE TO RELATED APPLICATION

This application is based upon and claims the benefit of priority of the prior Japanese Patent Application No. 2014-072703, filed on Mar. 31, 2014, the entire contents of which are incorporated herein by reference.

FIELD

The embodiments discussed herein are related to an information processing system and a control method of an information processing system.

BACKGROUND

In recent years, a distributed file system has been utilized in the field of information processing apparatuses. The distributed file system includes a storage device shared between or among a plurality of information processing apparatuses via a computer network etc. In the distributed file system, a block size of the storage device is fixed for restraining a decrease in terms of performance (especially a writing speed) in many cases. A block includes a processing unit of a reading/writing process executed by an Operating System (OS) with respect to the storage device such as a Hard Disk Drive (HDD) and a Solid State Disk (SSD).

DOCUMENT OF PRIOR ART

Patent Document

[Patent document 1] Japanese Laid-open Patent Publication No. 2008-052730
[Patent document 2] Japanese Laid-open Patent Publication No. 2003-150416

SUMMARY

According to an aspect of the embodiments, an information processing system comprises a processor. The processor executes a process that causes the information processing system to perform first writing, when requested to write data, data from which to subtract remainder data obtained by dividing a data size of write target data by a first data size of first processing unit data, the first data size being a size of processing unit data of a reading/writing process in a first storage device, in the write target data requested to be written to the first storage device and second writing the remainder data not being written by the first writing to a second storage device in which to set a second data size of second processing unit data, the second data size being smaller than the first data size of the first processing unit data.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Internal fragmentation becomes easier to occur in the storage device when data are stored in the storage device having a larger block size. The internal fragmentation includes an event that a remainder area occurs in the block. Therefore, a storage area of the storage device is not effectively used as the case may be. On the other hand, when the data are repeatedly read and written from and to the storage device having a small block size, an external fragmentation is easy to occur. The external fragmentation includes an event that the blocks for storing one set of data are not consecutively arranged, and the data are fragmented. Hence, Input/Output (IO) access efficiency of the storage device decreases as the case may be. In a system configured to execute a process of reading and writing the data from and to the storage device with the block size being fixed, the internal and external fragmentations (which will hereinafter be generically termed the fragmentation in the present specification) occur, resulting in difficulty to efficiently use the storage device. Such being the case, the technology to be disclosed in the present application restrains the fragmentation in the storage device.

An embodiment, which is disclosed in the present application, will hereinafter be described with reference to the drawings. A configuration of the embodiment, which will be demonstrated as below, is an exemplification, and a technical scope to be disclosed in the present application is not limited to the following mode.

EMBODIMENT

The embodiment will be described with reference to FIGS. 1A through 7. In the embodiment, a plurality of client terminal is connected to a storage device via a computer network.

<Configuration of Embodiment>

Figure 1A:
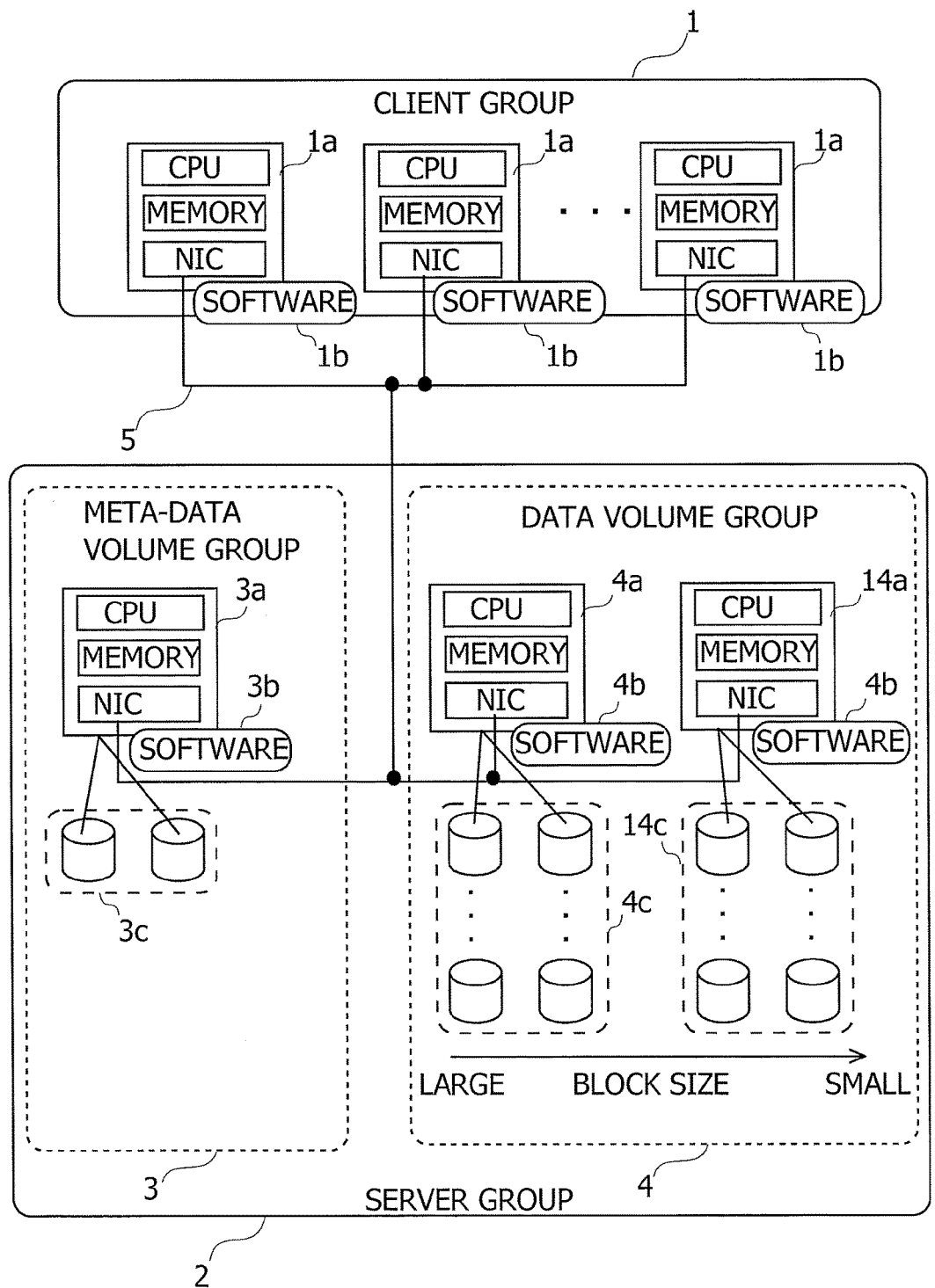
FIG. 1A is a diagram illustrating system architecture in an embodiment.

FIG. 1A is a diagram illustrating a system configuration in the embodiment. FIG. 1A depicts a client group 1, a server group 2 and a network environment 5. Each of the client group 1 and the server group 2 includes a plurality of nodes. The node includes an information processing apparatus. The client group 1 and the server group 2 are interconnected via the network environment 5.

The client group 1 includes a single or two or more nodes 1a. The node is the information processing apparatus including a Central Processing Unit (CPU), a memory and a Network Interface Card (NIC). Further, the node is includes software 1*b* to analyze an operation request of a user and to request the server group 2 to execute a process of reading and writing data. The data contains a file. The node is requests a node 3 to execute the process of reading and writing the data via the network environment 5.

The server group 2 stores the data in the storage device in response to the request given from the client group 1. The server group 2 includes a meta-data volume group 3 and a data volume group 4.

The meta-data volume group 3 is stored with an associative relationship between the data and the storage device saved with the data. The meta-data volume group 3 includes a node 3*a*, software 3*b* and a storage device 3*c*.

The node 3*a* is the information processing apparatus including the Central Processing Unit (CPU), the memory and the Network Interface Card (NIC) serving as a communication device. The node 3*a* is connected to the storage device 3*c*. The node 3*a* includes software 3*b*. Note that FIG. 1A illustrates one single node 3*a*. The embodiment is not, however, limited to a case where the number of node(s) 3*a* is "1". Two or mode nodes 3*a* may be provided.

The storage device 3*c* is stored with an associative relationship between the data and the storage device stored with the data. The storage device 3*c* is a storage device being connected to the node 3*a*. Upon receiving a data write request from the node 1*a*, the node 3*a* requests the data volume group 4 to write the data. Further, the node 3*a* stores, in the storage device 3*c*, an associative relationship between the data and the storage device to which the data are written. When receiving an access request for accessing the data stored in the data volume group 4 from the node 1*a*, the node 3*a* refers to the storage device 3*c*. The node 3*a* specifies, based on information stored in the storage device 3*c*, a storage device saved with requested data. A variety of connection methods can be applied to the connection between the storage device 3*c* and the node 3*a*. The applicable connection methods used for the connection between the storage device 3*c* and the node 3*a* are, e.g., Integrated Drive Electronics (IDE), Enhanced Integrated Drive Electronics (EIDE), Serial Advanced Technology Attachment (SATA), Small Computer System Interface (SCSI), Serial Attached SCSI (SAS) or Fibre Channel (FC).

The software 3*b* is run on the node 3*a*. The node 3*a* to execute the software 3*b* is one example of a "control unit". The control unit analyzes the request given from the node 1*a*, and thus determines which storage device is written with the data. The control unit determines the write destination storage device on the basis of a data size, an increase ratio of the data size and a system load.

The control unit, when determining the storage device as a data write destination on the basis of the data size, may set a reference block size. The reference block size is used when determining the storage device as the data write destination. The reference block size is compared with a data size of write target data. It may be sufficient that the reference block size is determined from a table generated per device type and per device raw performance of the storage device or from a calculation formula. The "raw performance" includes a processing speed to read or write the data from or to, e.g., successive blocks of the storage device. The "raw performance" includes a processing speed to execute sequential reading or sequential writing.

The control unit may also set a reference value of the increase ratio when determining the storage device as the data write destination on the basis of the increase ratio of the data size. The reference value of the increase ratio is compared with an increase ratio of the data size of the write target data. The reference value of the increase ratio is used when determining the storage device as the data write destination. It may be sufficient that the reference value of the increase ratio is determined in an operation test etc.

The control unit, when a present system load is higher than a reference value of a system load, may suspend the determination as to which storage device becomes the data write destination. The system load contains an IO load of the storage device. The control unit may, when suspending the determination of the storage device, write the data in a cache unit to temporarily cache the data. It may be sufficient that the reference value of the system load is determined in the operation test etc.

The data volume group 4 includes a node 4*a*, software 4*b*, a storage device 4*c*, a node 14*a* and a storage device 14*c*. The data volume group 4 executes a process of storing the data for which the write request is given from the node 1*a*.

The node 4*a* is the information processing apparatus including the Central Processing Unit (CPU), the memory and the Network Interface Card (NIC). The node 4*a* is connected to the storage device 4*c*. The node 4*a* includes software 4*b*.

The node 14*a* has the same configuration as the configuration of the node 4*a* except a point that the storage device 14*c* is connected as the storage device. Therefore, the same components as those of the node 4*a* are marked with the same numerals and symbols, and their explanations are omitted.

In FIG. 1A, the data volume group 4 includes the two nodes, i.e., the node 4*a* and the node 14*a*. The embodiment is not, however, limited to a case in which the number of the nodes included in the data volume group 4 is "2". The data volume group 4 may include, e.g., one single node. The data volume group 4 may also include, e.g., three or more nodes.

The storage device 4*c* and the storage device 14*c* are stored with the data transmitted from the nodes 1*a*. The storage device 4*c* is the storage device connected to the node 4*a*. The storage device 14*c* is the storage device connected to the node 14*a*. A block size larger than that of the storage device 14*c* is set in the storage device 4*c*. The block size is one example of "a size of first processing unit data" and "a size of second processing unit data". Similarly to the connection methods between the storage device 4*c* and the node 4*a*, a variety of connection methods can be applied to the connections between the storage device 4*c* and the node 4*a* and between the storage device 14*c* and the node 14*a*.

The software 4*b* is run on the node 4*a* and the node 14*a*. The node 4*a* executes the software 4*b* and operates together with the storage device 4*c* by way of one example of "a first storage device". The node 14*a* executes the software 4*b* and operates together with the storage device 14*c* by way of one example of "a second storage device". Each of the node 4*a* and the node 14*a* executes a process of reading or writing the data requested from the node 3*a*.

The network environment 5 is a computer network via which the client group 1 and the server group 2 are interconnected. The network environment 5 is a wired or wireless network. The network environment 5 is exemplified such as the Internet, a Local Area Network (LAN), a Virtual private Network (VPN), a wireless LAN and a telephone line for mobile phones.

<Function Blocks in Embodiment>

Figure 1B:
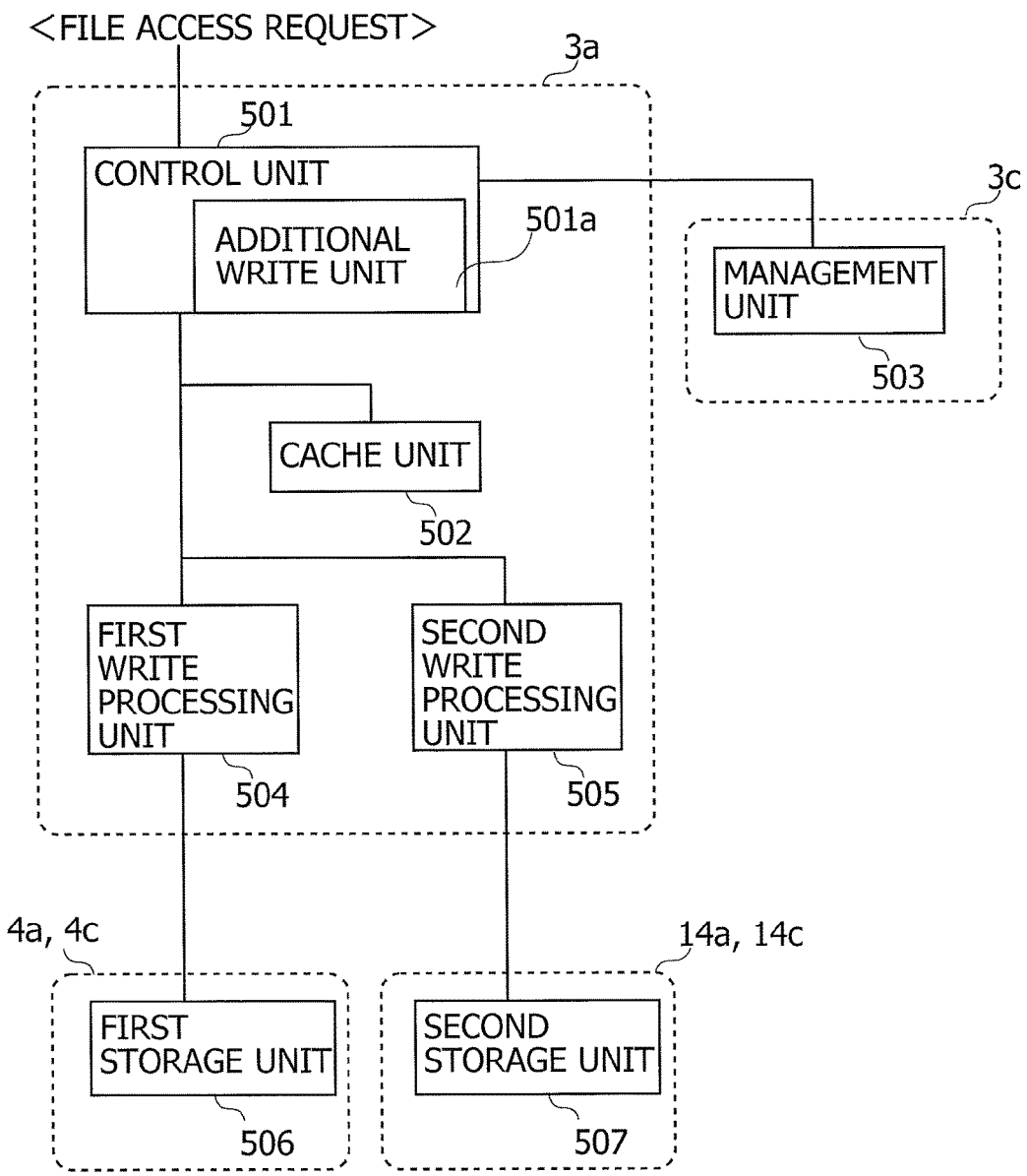
FIG. 1B is a diagram illustrating function blocks of a meta-data volume group and a data volume group.

FIG. 1B is a diagram illustrating function blocks of the meta-data volume group 3 and the data volume group 4. FIG. 1B depicts a control unit 501, an additional write unit 501*a*, a cache unit 502, a management unit 503, a first write processing unit 504, a second write processing unit 505, a first storage unit 506 and a second storage unit 507.

The control unit 501 analyzes the request given from the node is and thus determines which storage device receives execution of a data reading/writing process. The control unit 501 includes the additional write unit 501a. The control unit 501 specifies the storage device as a write destination on the basis of a data size of the requested data, an increase ratio of the data size thereof and a system load. The control unit 501 stores an associative relationship between requested data and specified storage device in the management unit 503. When a data access request is given, the control unit 501 specifies, based on information stored in the management unit 503, the storage device saved with the requested data. The node 3a executes, e.g., the software 3b, thereby providing the control unit 501.

The additional write unit 501a writes data additionally to the data being already stored in the first storage unit 506, the second storage unit 507 or the cache unit 502. The additional write unit 501a is one example of "an additional write process unit".

The cache unit 502 is temporarily cached with data in response to the request of the node 4a. In FIG. 1B, the cache unit 502 is provided by the node 3a. The embodiment is not, however, limited to a case in which the cache unit 502 is provided by the node 3a. The cache unit 502 may also provided by, e.g., the node 4a or the node 14a. The cache unit 502 may also be provided in a shared memory by providing, e.g., a shared memory area being accessible from at least two or more of the nodes 3a, 4a, 14a.

The management unit 503 is stored with an associative relationship between the data and the storage device stored with the data. Upon receiving the data write request, the control unit 501 stores, in the management unit 503, the associative relationship between the data and the storage device being written with the data. Upon receiving the data read request, the control unit 501 specifies, based on the information stored in the management unit 503, the storage unit stored with the data.

The first write processing unit 504 writes, to the first storage unit 506, data from which to subtract remainder data obtained by dividing a data size of the data being requested to be written in the write request data by the block size set in the first storage unit 506. The node 3a executes, e.g., the software 3b, thereby providing the first write processing unit 504. The first write processing unit is one example of "a first write processing unit".

The second write processing unit 505 writes, to the second storage unit 507, the remainder data not being requested to be written by the first write processing unit 504 in the write request data. The node 3a executes, e.g., the software 3b, thereby providing the second write processing unit 505. The second write processing unit 505 is one example of "a second write processing unit".

The first write processing unit 504 writes the data to the first storage unit 506. The first storage unit 506 is provided by, e.g., the node 4a and the storage device 4c. The first storage unit is one example of "a first storage device".

The second write processing unit 505 writes the data to the second storage unit 507. The second storage unit 507 is provided by, e.g., the node 14a and the storage device 14c. The second storage unit is one example of "a second storage device".

<Hardware Configuration of Information Processing Apparatus>

Figure 2:
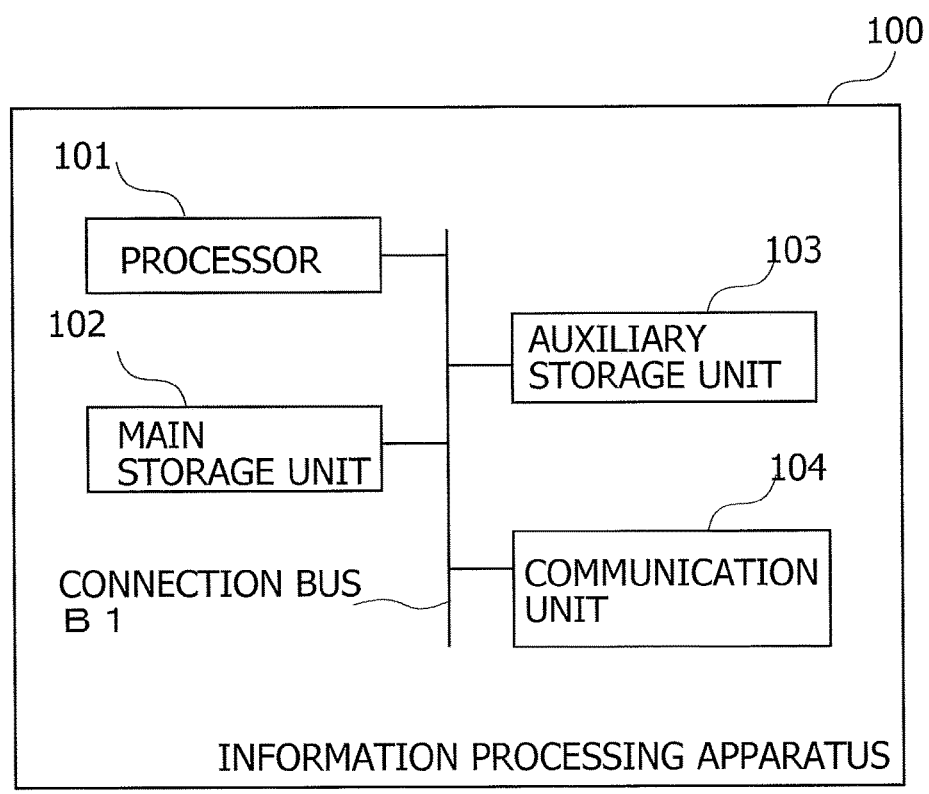
FIG. 2 is a diagram illustrating a hardware configuration of an information processing apparatus.

FIG. 2 is a diagram illustrating a hardware configuration of an information processing apparatus 100. The information processing apparatus 100 includes a processor 101, a main storage unit 102, an auxiliary storage unit 103, a communication unit 104 and a connection bus B1. The processor 101 includes a CPU. The processor 101, the main storage unit 102, the auxiliary storage unit 103 and the communication unit 104 are interconnected via the connection bus B1. The information processing apparatus 100 can be used as the node 1a, the node 3a, the node 4a or the node 14a.

In the information processing apparatus 100, the processor 101 deploys the program stored in the auxiliary storage unit 103 onto an operating area of the main storage unit 102 and executes the program, whereby peripheral devices are controlled. The information processing apparatus 100 is thereby enabled to attain functional means conforming to predetermined purposes. The main storage unit 102 and the auxiliary storage unit 103 are storage mediums being readable by the information processing apparatus 100.

The main storage unit 102 is exemplified as a storage unit that is accessed directly from the processor. The main storage unit 102 includes a Random Access Memory (RAM) and a Read Only Memory (ROM).

The auxiliary storage unit 103 stores various categories of programs and various items of data in a readable/writable manner on a recording medium. The auxiliary storage unit 103 is also called an external storage device. The auxiliary storage unit 103 is stored with an Operating System (OS), the various categories of programs or various types of tables. The OS contains a communication interface program to receive and transfer the data from and to the external apparatuses being connected via the communication unit 104. The external apparatuses include, e.g., other video processing apparatuses and external storage devices, which are connected via, e.g., the network etc. Note that the auxiliary storage unit 103 may also be provided by, e.g., a cloud system defined as a computer group on the network. The auxiliary storage unit 103 can be used as the storage device 3c, the storage device 4c or the storage device 14c.

The auxiliary storage unit 103 is exemplified such as an Erasable Programmable ROM (EPROM), a Solid State Disk (SSD) and a Hard Disc Drive (HDD). Further, the auxiliary storage unit 103 is exemplified such as a Compact Disk (CD) Drive, a Digital Versatile Disc (DVD) Drive and a Blu-ray (registered trademark) Disc (BD) Drive. Moreover, the auxiliary storage unit 103 may also be provided by way of a Network Attached Storage (NAS) or a Storage Area Network (SAN). The recording medium is exemplified such as a silicon disc including a nonvolatile semiconductor memory (flash memory), the hard disk, the CD, the DVD, the BD and a Universal Serial Bus (USB) memory.

The communication unit 104 is, e.g., an interface with the network environment 5. The communication unit 104 includes the NIC. The communication unit 104 performs the communication with the external apparatuses via the network environment 5.

The information processing apparatus 100 may further include, e.g., an input unit to accept an operating instruction etc. from the user etc. This type of input unit can be exemplified by an input device such as a keyboard, a pointing device, a touch panel, an acceleration sensor and a voice input device.

The information processing apparatus 100 may also be configured to include, e.g., an output unit to output the data processed by the processor 101 and the data stored in the main storage unit 102. This type of output unit can be exemplified by an output device such as a Cathode Ray Tube (CRT) Display, a Liquid Crystal Display (LCD), a Plasma Display Panel (PDP), an Electroluminescence (EL) Panel, an organic EL panel and a printer.

<Outline of Softwarewise Process>

Figure 3:
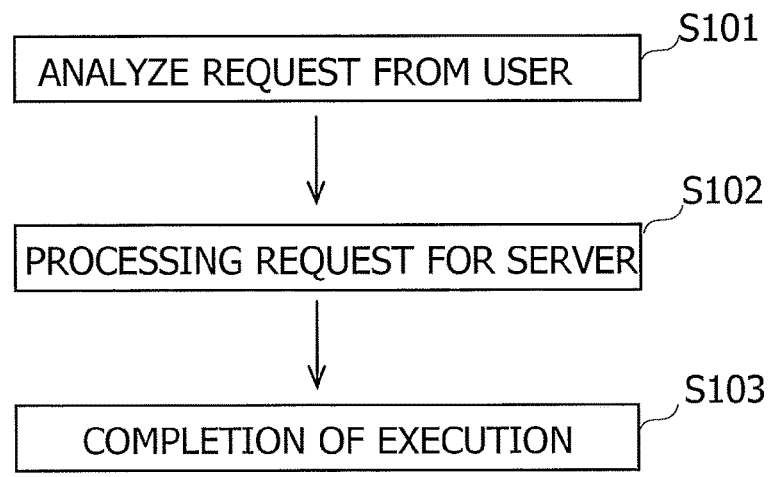
FIG. 3 is a flowchart illustrating a processing flow of software executed by a node of a client group.

FIG. 3 is a flowchart illustrating a processing flow of the software 1b executed by the node is of the client group 1. The processing flow of the software 1b will hereinafter be described with reference to FIG. 3.

The node is accepts a user's request from on the keyboard etc. The node is analyzes contents of an accepted user's request. The user's request is e.g., a process of writing or reading the data (S101). The node is transmits the accepted user's request to the server group 2 (S102). The data write or read processing request given to the server group 2 from the node is completed (S103).

Figure 4:
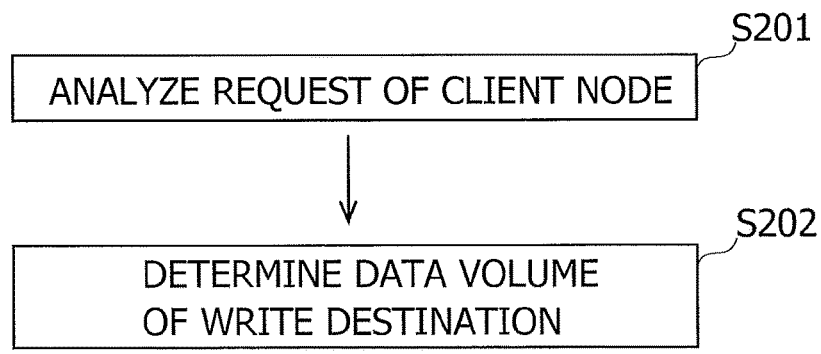
FIG. 4 is a flowchart illustrating a processing flow of the software executed by the node of the meta-data volume group.

FIG. 4 is a flowchart illustrating a processing flow of the software 3b executed by the node 3a of the meta-data volume group 3. The processing flow of the software 3b will hereinafter be described with reference to FIG. 4.

The node 3a accepts a request from the node 1a. The node 3a analyzes an accepted request given from the node 1a. The node 3a specifies a data size of the data requested by the node is to be processed. The node 3a may specify whether the process requested from the node is a data write process or a data read process (S201). The node 3a determines, corresponding to the data size specified in S201, which node is to connect with a data volume becoming a data write destination (S202).

Figure 5:
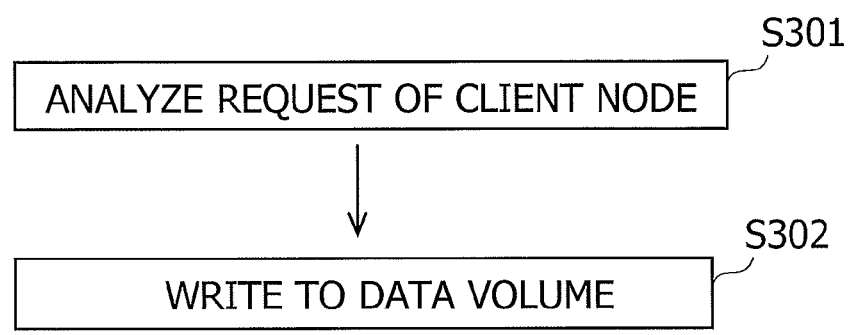
FIG. 5 is a flowchart illustrating a processing flow of the software executed by the node of the data volume group.

FIG. 5 is a flowchart illustrating a processing flow of the software 4b executed by the node 4a or the node 14a of the data volume group 4. The processing flow of the software 4b will hereinafter be described with reference to FIG. 5.

The node 4a or the node 14a analyzes a request received from the node is (S301). The node 4a or the node 14a writes the data received from the node is to the storage device 4c or the storage device 14c specified by the node 3a (S302).

<Write Process of File>

Figure 6:
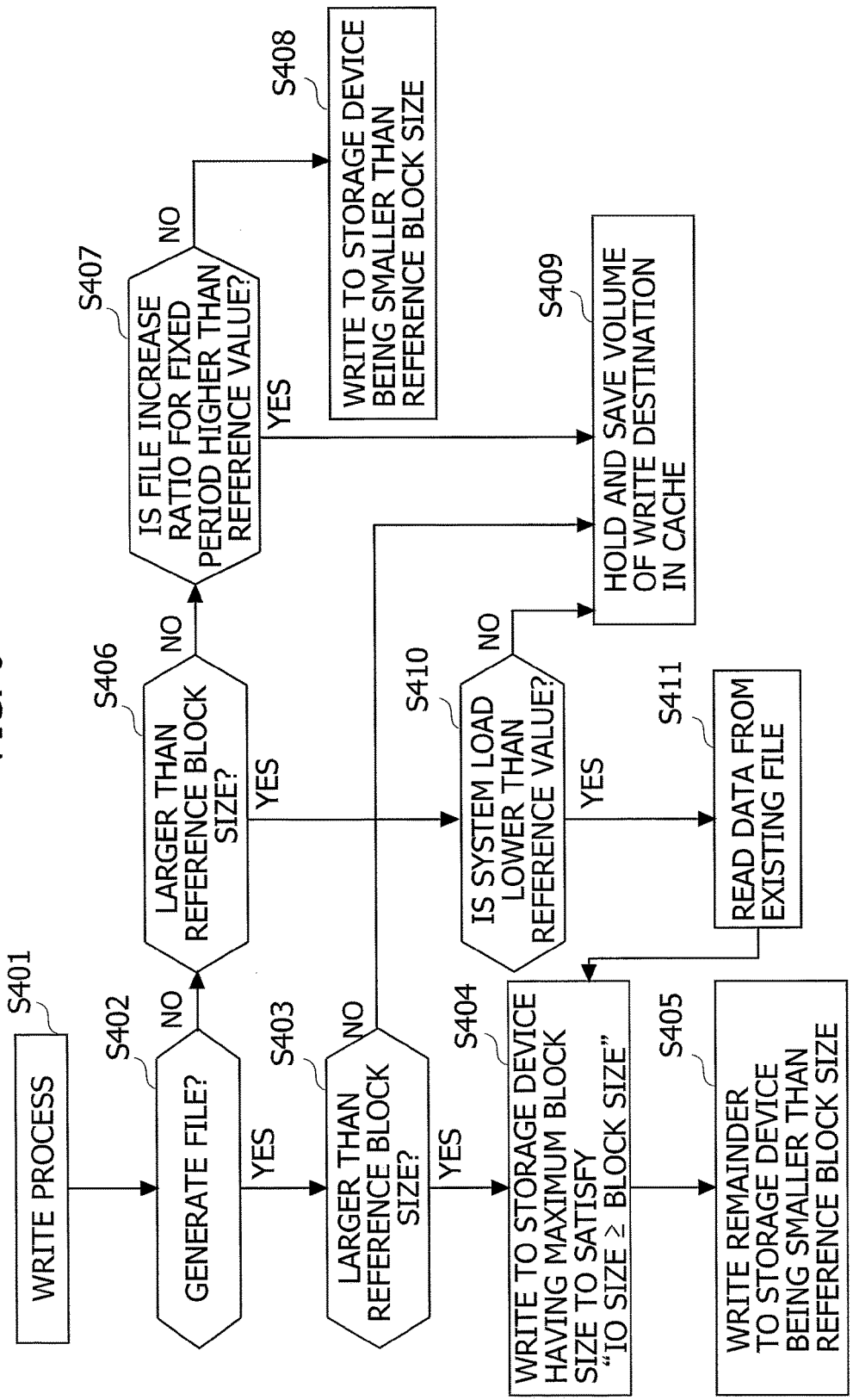
FIG. 6 is a flowchart illustrating details of the processing flow of the software executed by the node of the meta-data volume group.

FIG. 6 is a flowchart illustrating details of a processing flow of the software 3b executed by the node 3a of the meta-data volume group 3. FIG. 6 depicts the details of the process being outlined in FIG. 4. The processing flow of the software 3b will hereinafter be described with reference to FIG. 6. Note that the discussion in FIG. 6 assumes that a file size of the write target file is "5 MB", the block size of the storage device 4c is "2 MB", and the block size of the storage device 14c is "1 MB".

At first, a process in the case of generating a new file will be described by referring to S401-S405 and S409. The node 3a accepts the write request from the node is (S401). The node 3a determines whether the request given from the node is a request for generating the new file or not (S402). When generating the new file (YES in S402), the node 3a compares the IO size with the reference block size. The IO size is a size of the data that is inputted and output to, e.g., the storage device. When generating the new file, the IO size is, e.g., a file size of the generated new file (S403). When the IO size is larger than the reference block size (YES in S403), the node 3a specifies, from the data volume group 4, the storage device in which a maximum block size is set within a range being equal to or smaller than the IO size. This specifying process is one example of "a control step". Further, the CPU of the node 3a executes this specifying process by way of one example of "a control unit". Herein, the storage device 4c is specified. The node 3a requests the node 4a being connected to the storage device 4c to execute a file write process. The node 4a stores the file in the storage device 4c in response to the request given from the node 3a. Note that the node 3a might not request the node 4a to write all of the file data. The node 3a may request the node 4a to write the data of a part of the file. The data of a part of the file contains data from which to subtract remainder data obtained by dividing the file size of the write target file by the block size being set in the storage device 4c. Herein, the node 3a requests the node 4a to write the data with its data size being 4 MB (2 MB×2 blocks) in the write target file of 5 MB. The process, in which the node 3a requests the node 4a to write the file, is one example of "a first write processing step". The CPU of the node 3a executes the process of requesting the node 4a to write the file (S404). The node 3a requests a node to execute the process of writing the remainder data of the write target file not being requested to be written in the process of S404, this requested node being connected to the storage device in which the block size smaller than the reference block size is set. Herein, the node 3a requests the node 14a to write the data with its data size being 1 MB in the write target file of 5 MB. The node 14a stores the requested data having the data size of 1 MB in the storage device 14c in response to the request of the node 3a. The process, in which the node 3a requests the node 14a to write the file data, is one example of "a second write processing step". The node 3a executes the process of requesting the node 14a to write the file data by way of one example of "the second write processing step" (S405). When the IO size is equal to or smaller than the reference block size (NO in S403), the node 3a suspends specifying the storage device becoming the file write destination. The node 3a stores the file requested to be written as being cached in the cache unit 502. The process of storing the file in the cache unit 502 is one example of "a control step". Further, the CPU of the node 3a executes the process in S409 by way of one example of "a control unit". The process in S409 is one example of "a process of storing data requested to be written in a cache unit serving as a temporary storage area" (S409).

Next, a process of writing data additionally to an existing file will be described with reference to Steps from S406 onward. When writing the data additionally to the existing file (NO in S402), the node 3a compares the file size of the write target file with the reference block size. Herein, the file size of the target file to be compared with the reference block size is a file size of the post-additional-written file (S406). When the file size of the post-additional-written file is equal to or smaller than the reference block size (NO in S406), the node 3a compares an increase ratio of the file with a reference value of the increase ratio. The increase ratio of the file is a ratio of a file increase quantity per unit time. The increase ratio of the file is determined, e.g., in the following formula (1).

$$\text{(Increase Ratio of File)} = (d1-d0) \div (t1-t0) \qquad \text{Formula 1}$$

The symbol "d1" in the formula (1) represents a file size when making the write request this time. The symbol "d0" in the formula (1) represents a file size when making the write request last time. The unit of "d1" and "d0" in the formula (1) is, e.g., "byte". The symbol "t1" in the formula (1) designates time when making the write request this time. The symbol "t0" in the formula (1) designates time when making the write request last time. The unit of "t1" and "t0" in the formula (1) is, e.g., "second". Namely, the formula (1) represents the increase quantity of the file size per unit time. It may be sufficient that the reference value of the increase ratio is determined in the operation test etc. (S407). When the increase ratio of the file is equal to or smaller than the reference value of the increase ratio (NO in S407), the node 3a requests a node to write the data to an additional write file segment of the file, the node being connected to the storage device in which the block size smaller than the reference block size is set. Herein, the node 3a requests the node 14a to execute writing to the file. The node 3a, when there are the data being already stored in the cache unit 502, requests the node 14a to write the file together with the data stored in the cache unit 502. The node 14a executes the process of writing the file to the storage device 14c in response to the request given from the node 3a (S408). When the file size of the post-additional-written file is larger than the reference block size (YES in S406), the node 3a determines the system load of the data volume group 4. The system load includes the IO loads on the storage device 4c and the storage device 14c. The system load is determined in a way that makes the comparison with the reference value of the system load (S410). When the system load is smaller than the reference value of the system load (YES in S410), the node 3a requests the node 4a and the node 14a to read the data of the existing files being stored in any one or more of the storage device 4c, the storage device 14c and the cache unit 502. The node 4a and the node 14a read the stored data in response to the request given from the node 3a. The read-in data are written to the storage device in processes from S404 onward. The processes in S411 through S404 and S405 are given by way of one example of "an additional write process step". Moreover, the CPU of the node 3a executes the processes in S411 through S404 and S405 by way of one example of "an additional write process unit" (S411). When the increase ratio of the file is higher than the reference value of the increase ratio (YES in S407) or when the system load is equal to or higher than the reference value of the system load (NO in S410), the node 3a suspends specifying the storage device becoming the file write destination. The node 3a stores, in the cache unit 502, the additionally written segment of the file being requested to be written. The process of storing in the cache unit 502 is one example of "a control step". Further, the CPU of the node 3a executes the process in S409 by way of one example of "a control unit". The process in S409 is one example of "a process of storing the data being requested to be written in a cache unit as a temporary storage area" (S409).

As described above, the node 3a, when requested to execute the process of writing the file, specifies the storage device, in which to set the maximum block size in the range being equal to or smaller than the IO size, from within the plurality of storage devices in which different block sizes are set. The node 3a requests the node being connected to the specified storage device to write the file. Hence, there is reduced an empty area occurring in the blocks of the storage device. As a result, the storage capacity of the storage device is efficiently used.

The file write request in the embodiment includes a file reallocation process as in the processes of S404, S405, S407 and S408. This file reallocation process can be also said to be an automated defragmentation process (which will hereinafter be termed the defragmentation in the present specification). As a result, even when the user does not explicitly request the defragmentation, a fragmentation is restrained from occurring in storage device.

The file additional write process in the embodiment does not involve, when the system load is higher than the reference value of the system load, writing the file to the storage device 4c or the storage device 14c. As a result, the file additional write process in the embodiment enables reductions of the system loads on the storage device 4c and on the storage device 14c.

The file additional write process in the embodiment includes the file reallocation process executed by reading the data being already stored in the storage device 4c etc. in S411, S404 and S405. As a result, the file additional write process in the embodiment enables the fragmentation to be restrained from occurring in the storage device.

<Execution of Defragmentation by User's Request>

Figure 7:
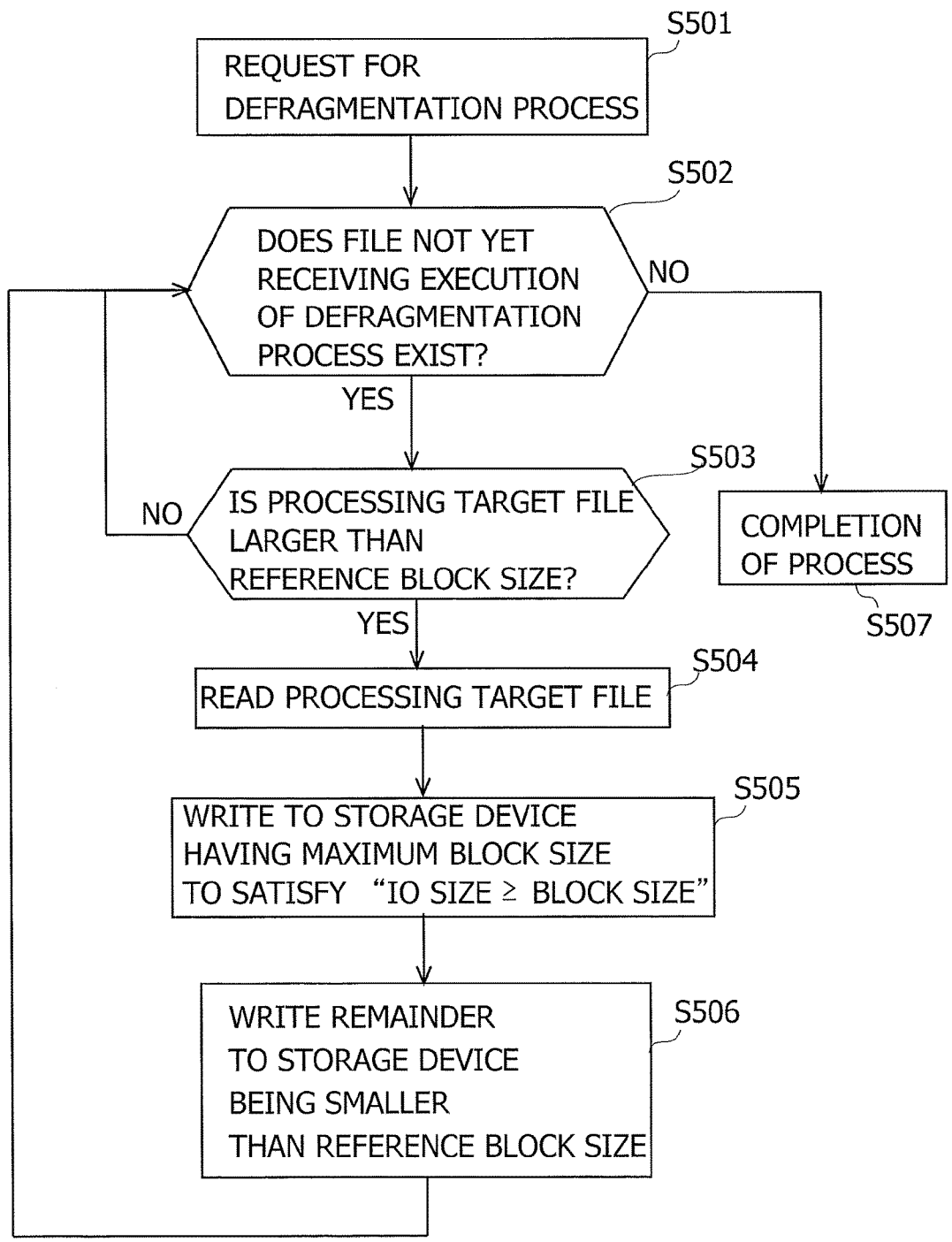
FIG. 7 is a flowchart illustrating a processing flow when executing defragmentation in response to a user's request.

FIG. 7 is a flowchart illustrating a processing flow when the defragmentation is executed in response to a user's request. Processes when executing the defragmentation in response to the user's request will hereinafter be described with reference to FIG. 7.

The node is accepts the request for the defragmentation from the user. The node is transmits accepted request for the defragmentation to the node 3a (S501). The node 3a checks whether or not any file not yet being defragmented exists in the storage device 4c or the storage device 14c. The "file not yet being defragmented" contains a file not stored in the storage device in which to set the maximum block size within the range being equal to or smaller than the file size of this file (S502). When the file not yet being defragmented exists therein (YES in S502), the node 3a compares file size of the defragmentation target file with the reference block size. When the file size of the defragmentation target file is equal to or smaller than the reference block size, the node 3a loops back the processing to S502 (S503). Whereas when the file size of the defragmentation target file is larger than the reference block size (YES in S503), the node 3a reads the defragmentation target file. When the defragmentation target file is segmented and stored separately in a plurality of storage devices, the node 3a reads segmented files from all of the storage devices (S504). The node 3a specifies, from within the data volume group 4, the storage device in which the maximum block size is set within the range being equal to or smaller than the file size of the defragmentation target file. It is herein assumed that the storage device 4c is to be specified. The node 3a requests the node 4a, to which the storage device 4c is connected, to execute the process of writing the file. Note that the node 3a might not request the node 4a to write the data of all files. The node 3a may write the data from which to subtract the remainder data obtained by dividing the file size of, e.g., the defragmentation target file by the block size of the storage device 4c connected to the node 4a (S505). The node 3a requests the node 4a or the node 14a to execute the process of writing the remainder data not being requested to be written in the process S404, the requested node receiving the setting of the block size smaller than the reference block size (S506). When the defragmentation of the all files is completed (NO in S502), the defragmentation process finishes (S507).

As described above, the defragmentation in the embodiment involves specifying the storage device in which to set the maximum block size within the range being equal to or smaller than the file size, from within the plurality of storage devices in which the different block sizes are set. The node 3a requests the node, to which the specified storage device is connected, to execute the file write process. As a result, the fragmentation in the storage device is restrained.

The embodiment involves including the plurality of storage devices in which the different block sizes are set. The node 3a specifies the storage device in which to set the maximum block size within the range being equal to or smaller than the file size when executing the file write process or when being defragmented. The node 3a requests the node, to which the specified storage device is connected, to write the file. As a consequence, the fragmentation in the storage device is restrained.

First Working Example

A first working example will discuss a case of using the SSDs as the storage device 4c and the storage device 14c. The SSD has a high reading performance based on a random access as compared with the HDD. Therefore, a processing frequency to read the data being already stored in the storage device etc. may be set high as compared with the HDD on the occasion of the data additional write process. This being the case, the value of "the reference block size" used in S403 and S406 of FIG. 6 is set to a value smaller than in the case of using the HDD as the storage device. When the value of "the reference block size" is set small, for instance, there increases the frequency to execute the processes in S404, S405 and S411 of FIG. 6. Namely, there rises the frequency to execute the process of writing the file to the storage device being determined based on the reference block size. Hence, the fragmentation in the storage device is restrained. As a consequence, the IO performance of each of the storage device 4c and the storage device 14c is improved.

Second Working Example

A second working example will discuss a case of using the HDDs having the high raw performance as the storage device 4c and the storage device 14c. The HDD having the high raw performance exhibits a high reading or writing performance within the same block, alternatively from or to the successive blocks as compared with the HDD exhibiting a low raw performance. It is therefore preferable to execute the process of writing the data to the storage device in which a much larger block size is set on the occasion of additionally writing the data. Such being the case, the value of "the reference block size" used in S403 and S406 of FIG. 6 is set to a value higher than in the case of using the HDD having the low raw performance as the storage device. For example, when the raw performance of the same type of device is doubled, it may be sufficient that "a 2-fold reference block size" is set. When the value of "the reference block size" is set large, there rises the frequency to execute the process in, e.g., S409 of FIG. 6. Hence, the data requested to be written are accumulated to some extent in the cache unit 502, and thereafter such as a frequency increases as to write batchwise the data accumulated in the cache unit 502 to the storage device. As a result, the data are easier to be stored in the storage device in which the larger block size is set than in the case of not accumulating the data in the cache unit 502. Consequently, in the second working example, the fragmentation in the storage device is restrained.

Third Working Example

A third working example will discuss a system configured to prepare a plurality of storage devices in which the same block size is set. The preparation of the plurality of storage devices in which the same block size is set, enables a reduction of concentration (congestion) of the IO accesses to a specified storage device. Therefore, the IO load per storage device is reduced. This being the case, in the third working example, the reference value of the system load is set high. As a result, there rises the frequency to execute the processes in S411, S404 and S405 of FIG. 6. Namely, there increases the frequency to execute the process of writing the file to the storage device being determined based on the reference block size. Hence, the fragmentation in the storage device is restrained. As a result, the IO performance of the data volume group 4a is improved.

Fourth Working Example

A fourth working example involves preparing a plurality of storage devices in which to set the block sizes being larger or smaller than the reference value of the block size. The block sizes of the plurality of prepared storage devices are set stepwise larger or smaller than the reference value of the block size. Therefore, in S404 of FIG. 6, the file having the large file size is stored in the storage device in which the larger block size is set. Further, in S405 and S408 of FIG. 8, the file having the small file size is stored in the storage device in which the smaller block size is set. Note that there may be prepared in the fourth working example one plurality of storage devices in which the block size larger than the reference value of the block size is set, or another plurality of storage devices in which the block size smaller than the reference value thereof.

In the fourth working example, the file having the large file size is stored in the storage device in which the larger block size is set. Moreover, in the fourth working example, the file having the small file size is stored in the storage device in which the smaller block size is set. As a result, in the fourth working example, the fragmentation in the storage device is restrained. Furthermore, the plurality of storage devices being provided in the fourth working example, it is feasible to reduce the concentration (congestion) of the IO accesses to the specified storage device in the same way as in the third working example. Consequently, the IO load per storage device is decreased.

<Initial Configuring Procedure>

Figure 8:
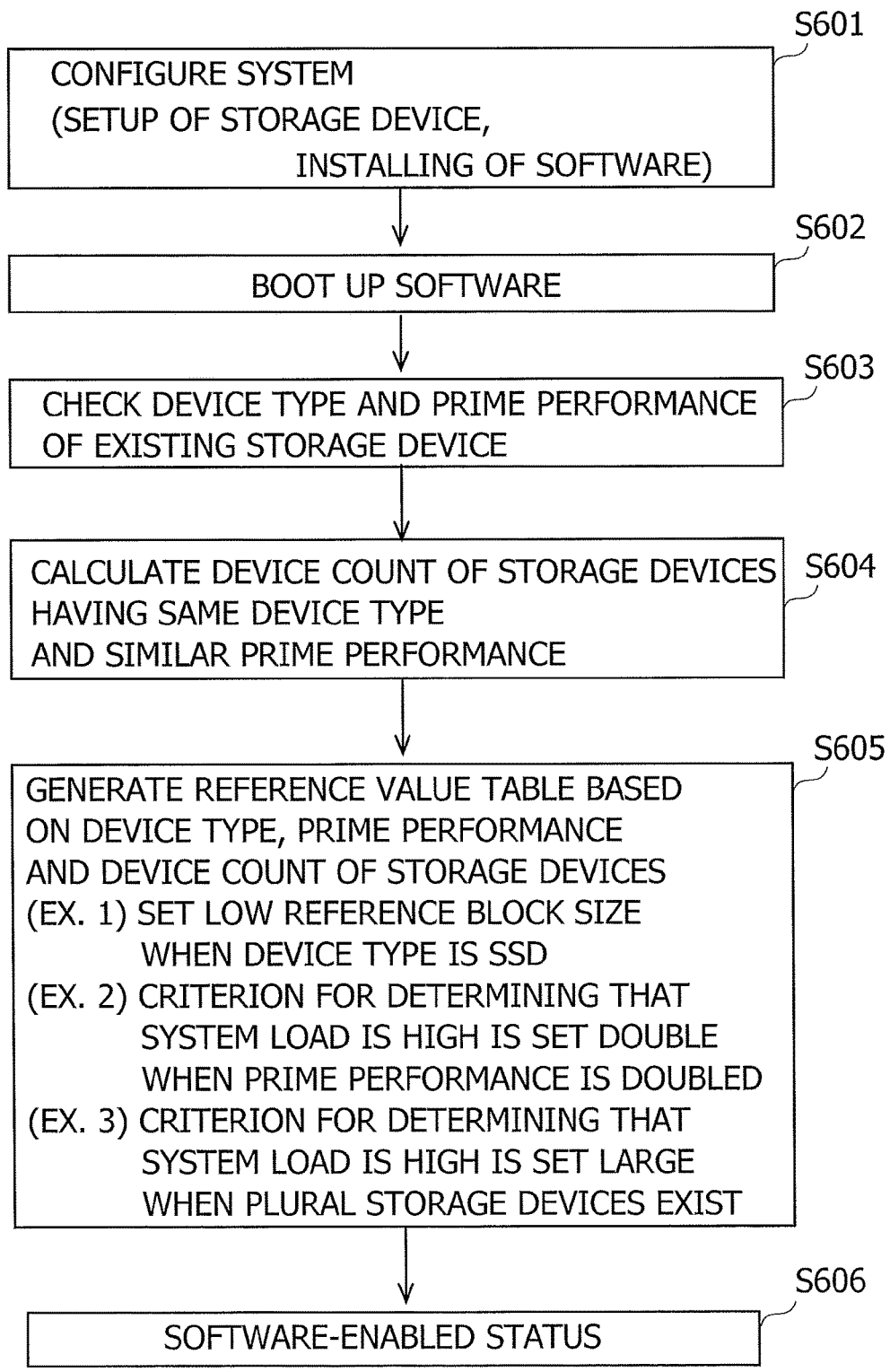
FIG. 8 is a flowchart illustrating a procedure of initially configuring the system in the embodiment.

The system in the embodiment described above is configured in, e.g., a procedure that will be described as below. FIG. 8 is a diagram illustrating an initial setting procedure of the system in the embodiment. The procedure of initially setting the system in the embodiment will hereinafter be described with reference to FIG. 8.

Hardware setup of hardware components included in the client group 1, the server group 2 and the network environment 5, is conducted. The client group 1 and the server group 2 are interconnected via the network environment 5. The software 1b is installed into the node 1a. The software 3b is installed into the node 3a. The software 4b is installed into the node 4a and the node 14a (S601). The software is booted up on the node 1a, the node 3a, the node 4a and the node 14a (S602). The device types and the raw performances of the storage device 4c and the storage device 14c are checked. The device type contains a distinction of the SSD or the HDD (S603). A device count of the storage devices included in the storage device 4c and a device count of the storage devices included in the storage device 14c are totalized per device type and per raw performance (S604). A table of the respective reference values is generated based on the device type, the raw performance and the device count of the storage devices. Each reference value contains the reference block size, the reference value of the file increase ratio and the reference value of the system load. For example, when the device type of the storage device is the SSD, the reference block size is set to a smaller value than in the case of the HDD. Moreover, for instance, the larger value of the reference block size is set in the HDD exhibiting the high raw performance than in the HDD exhibiting the low raw performance (S605).

The embodiment and the working examples, which are disclosed so far, can be combined, respectively.

The technology to be disclosed in the present application is capable of restraining the fragmentation in the storage device.

<Non-Transitory Computer Readable Recording Medium>

A program to make a computer, other machines and devices (which will hereinafter be referred to as the computer etc.) attain any one of the functions can be recorded on a non-transitory recording medium readable by the computer etc. Then, the computer etc. is made to read and execute the program on this recording medium, whereby the function thereof can be provided.

Herein, the non-transitory computer-readable recording medium connotes a recording medium capable of accumulating information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory and so on are given as those removable from the computer. Further, a hard disc, a ROM (Read-Only Memory), etc. are given as the recording mediums fixed within the computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising a processor executing a process that causes the information processing system to perform:
    first writing, when requested to write data, subtracted data obtained by subtracting remainder data from write target data being requested to be written to the first storage device, the remainder data being obtained by dividing a data size of the write target data by a first data size of first processing unit data and the first data size being a size of processing unit data of a reading/writing process in a first storage device; and
    second writing the remainder data not being written by the first writing to a second storage device in which a second data size of second processing unit data is smaller than the first data size,
    determining whether or not the data size of the write target data is larger than a reference size, the reference size being determined based on a device type and a raw performance, the reference size when the device type is SSD being determined smaller than the reference size when the device type is HDD, the raw performance indicating a processing speed to read or write the data from or to successive blocks of a storage device,
    wherein the first writing and the second writing is performed when the determining determines the data size of the write target data is larger than the reference size.

2. The information processing system according to claim 1, wherein the processor executes the process that further causes the information processing system to perform specifying, as the first storage device, a storage device in which the data size of processing unit data is equal to or smaller than the data size of the write target data from within a plurality of storage devices in which different data sizes of processing unit data are set.

3. The information processing system according to claim 2, wherein the processor executes the process that further causes the information processing system to perform first storing the write target data in a cache unit as a temporary storage area when determining that a load on each of the first storage device and the second storage device is higher than a first reference value.

4. The information processing system according to claim 2, wherein the processor executes the process that further causes the information processing system to perform second storing the write target data in the cache unit as a temporary storage area when an increase ratio defined as an increase quantity, per unit time, of the data size of the write target data is higher than a second reference value.

5. The information processing system according to claim 1, wherein the processor executes the process that further causes the information processing system to perform:
    reading, when the data write request is a request for an additional write to the data being already stored in the first storage device, the second storage device or the cache unit, stored data from the first storage device, the second storage device and the cache unit; and
    making the first storage device and the second storage device process the data read by the reading together with the data requested to be additionally written.

6. A control method of an information processing system, the control method comprising:
    first writing, when requested to write data, subtracted data obtained by subtracting remainder data from write target data being requested to be written to the first storage device, the remainder data being obtained by dividing a data size of the write target data by a first data size of first processing unit data and the first data size being a size of processing unit data of a reading/writing process in a first storage device; and
    second writing the remainder data not being written in the first writing to a second storage device in which a second data size of second processing unit data is smaller than the first data size,
    determining whether or not the data size of the write target data is larger than a reference size, the reference size being determined based on a device type and a raw performance, the reference size when the device type is SSD being determined smaller than the reference size when the device type is HDD, the raw performance indicating a processing speed to read or write the data from or to successive blocks of a storage device,
    wherein the first writing and the second writing is performed when the determining determines the data size of the write target data is larger than the reference size.

7. The control method of the information processing system according to claim 6, wherein the control method further comprises specifying, as the first storage device, a storage device in which the data size of processing unit data is equal to or smaller than the data size of the write target data from within a plurality of storage devices in which different data sizes of processing unit data are set.

8. The control method of the information processing system according to claim 7, wherein the control method further comprises first storing the write target data in a cache unit as a temporary storage area when determining that a load on each of the first storage device and the second storage device is higher than a first reference value.

9. The control method of the information processing system according to claim 7, wherein the control method further comprises second storing the write target data in a cache unit as a temporary storage area when an increase ratio defined as an increase quantity, per unit time, of the data size of the write target data is higher than a second reference value.

10. The control method of the information processing system according to claim 6, wherein the control method further comprises:
reading, when the data write request is a request for an additional write to the data being already stored in the first storage device, the second storage device or the cache unit, stored data from the first storage device, the second storage device and the cache unit; and
making the first storage device and the second storage device process the data read by the reading together with the data requested to be additionally written.

11. A non-transitory computer-readable recording medium having stored therein a control program of an information processing system including a processor, the control program to cause the processor to perform:
first writing, when requested to write data, subtracted data obtained by subtracting remainder data from write target data being requested to be written to the first storage device, the remainder data being obtained by dividing a data size of the write target data by a first data size of first processing unit data and the first data size being a size of processing unit data of a reading/writing process in a first storage device; and
second writing the remainder data not being written in the first writing to a second storage device in which a second data size of second processing unit data is smaller than the first data size,
determining whether or not the data size of the write target data is larger than a reference size, the reference size being determined based on a device type and a raw performance, the reference size when the device type is SSD being determined smaller than the reference size when the device type is HDD, the raw performance indicating a processing speed to read or write the data from or to successive blocks of a storage device,
wherein the first writing and the second writing is performed when the determining determines the data size of the write target data is larger than the reference size.

12. The non-transitory computer-readable recording medium having stored therein the control program according to claim 11, the control program to cause the processor to further perform specifying, as the first storage device, a storage device in which the data size of processing unit data is equal to or smaller than the data size of the write target data from within a plurality of storage devices in which different data sizes of processing unit data are set.

13. The non-transitory computer-readable recording medium having stored therein the control program according to claim 12, the control program to cause the processor to further perform first storing the write target data in a cache unit as a temporary storage area when determining that a load on each of the first storage device and the second storage device is higher than a first reference value.

14. The non-transitory computer-readable recording medium having stored therein the control program according to claim 12, the control program to cause the processor to further perform second storing the write target data in a cache unit as a temporary storage area when an increase ratio defined as an increase quantity, per unit time, of the data size of the write target data is higher than a second reference value.

15. The non-transitory computer-readable recording medium having stored therein the control program according to claim 13, the control program to cause the processor to further perform:
reading, when the data write request is a request for an additional write to the data being already stored in the first storage device, the second storage device or the cache unit, stored data from the first storage device, the second storage device and the cache unit; and
making the first storage device and the second storage device process the data read by the reading together with the data requested to be additionally written.

* * * * *